Dec. 6, 1927.
J. VAN NORTWICK
1,651,422
CORN HARVESTING MACHINE
Filed April 24, 1924  3 Sheets-Sheet 1
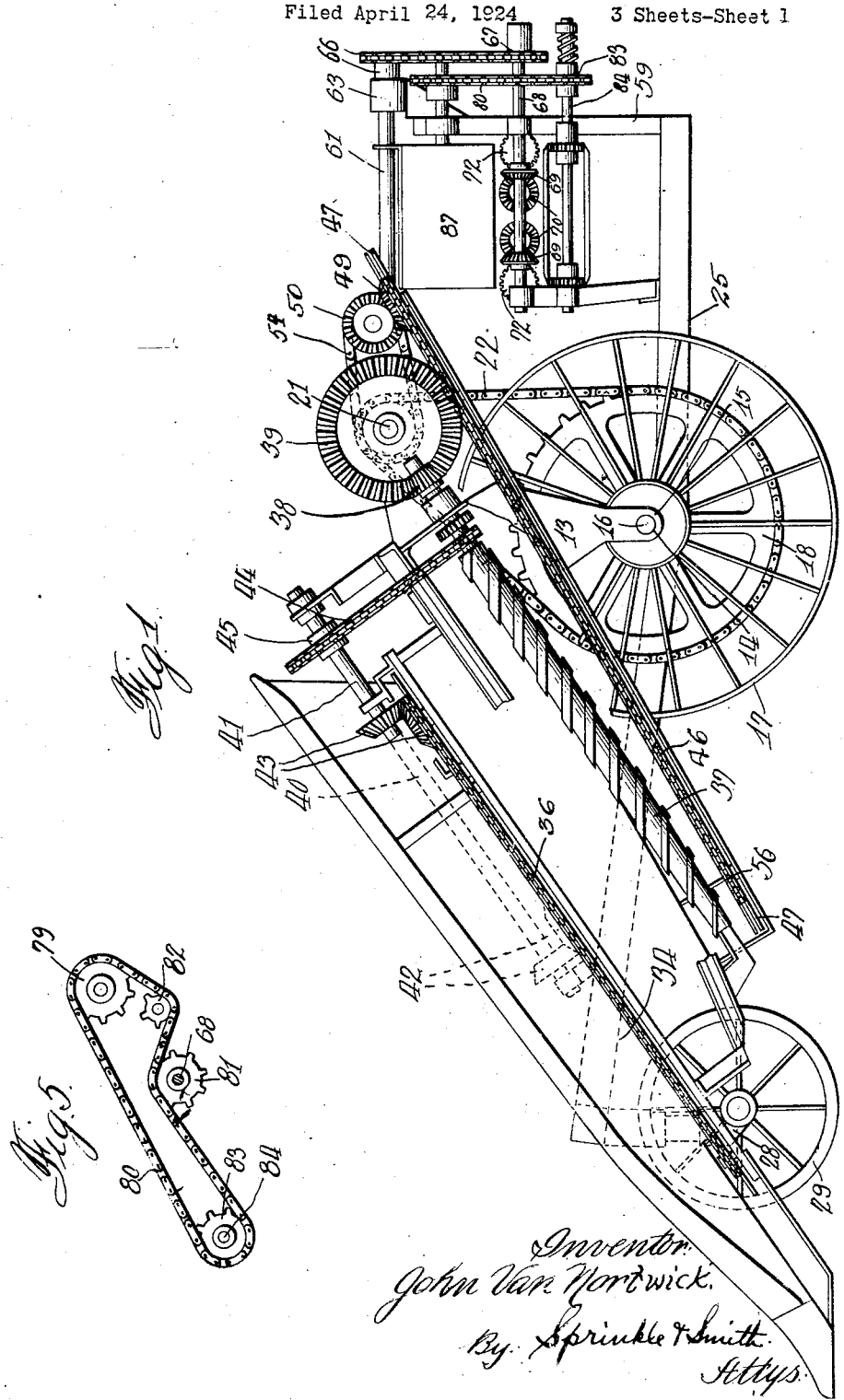
Inventor
John Van Nortwick.
By Sprinkle & Smith
Attys.

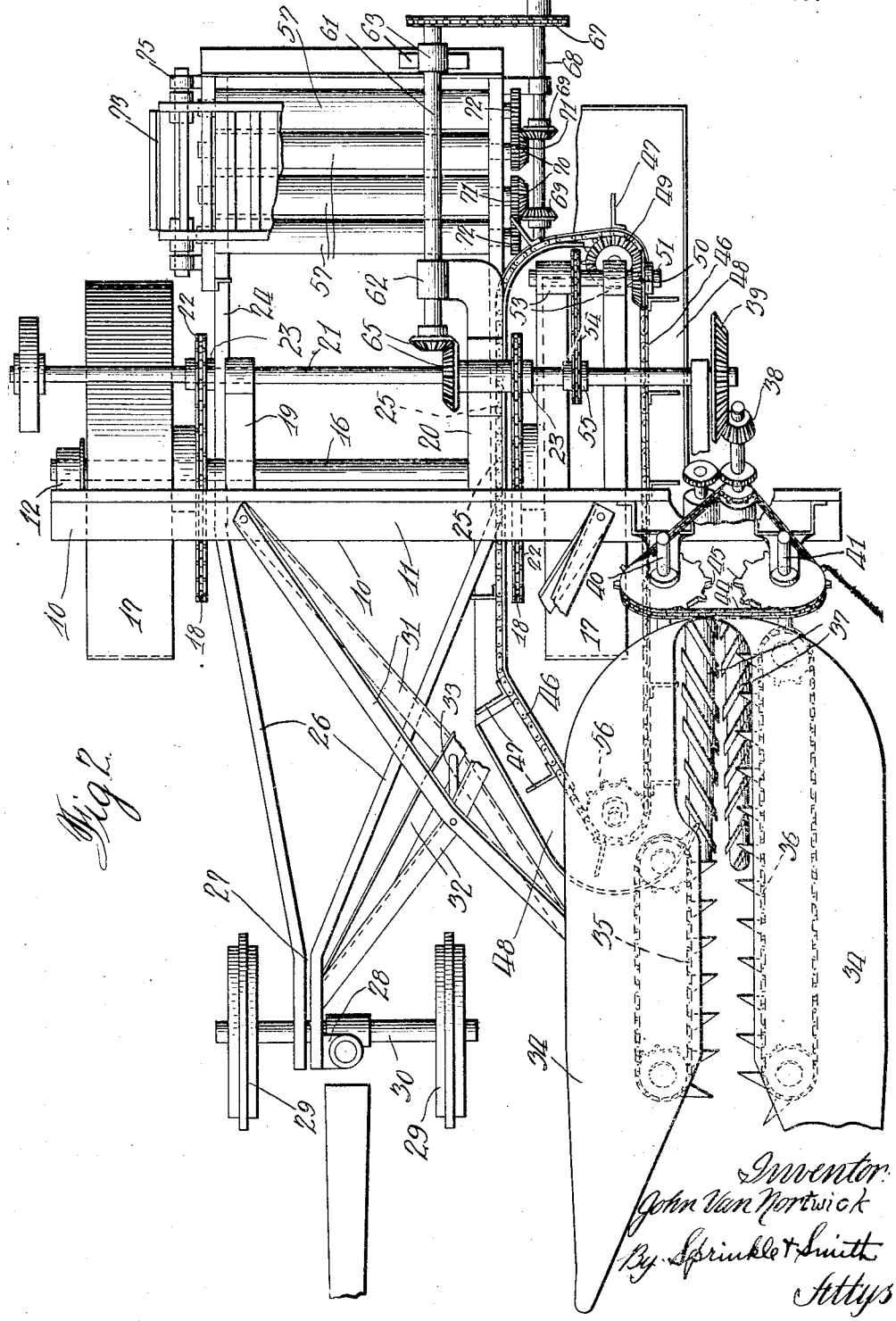

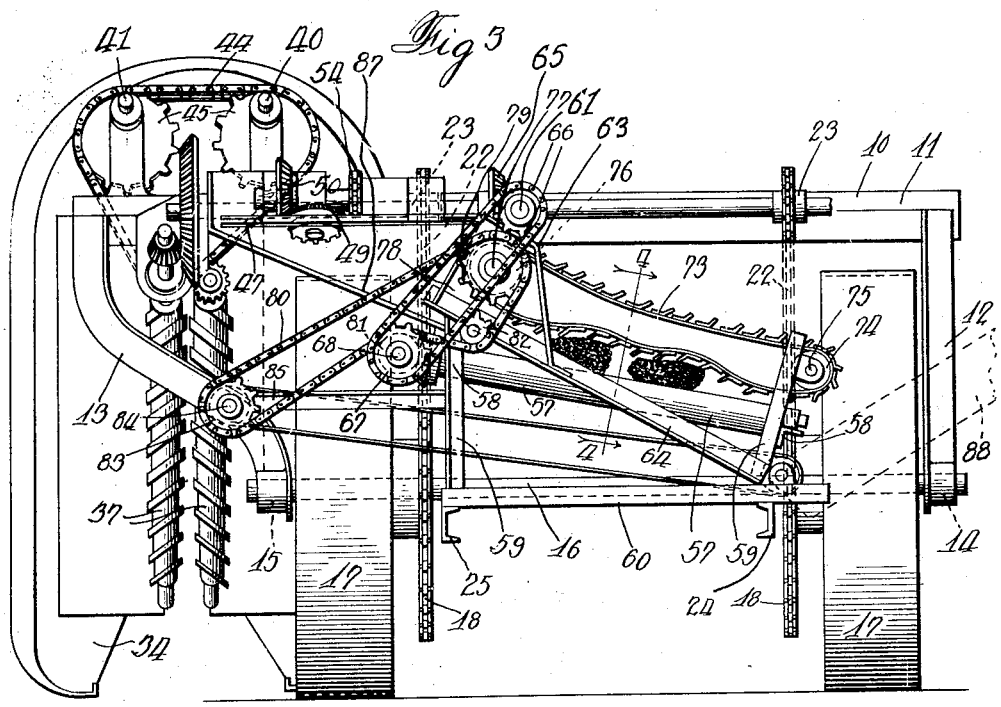
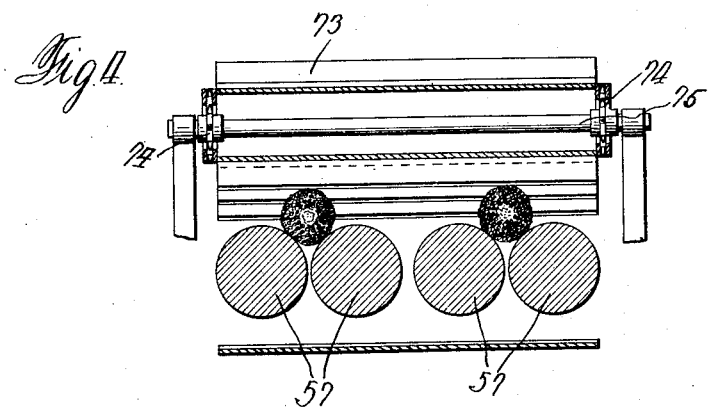

Patented Dec. 6, 1927.

1,651,422

UNITED STATES PATENT OFFICE.

JOHN VAN NORTWICK, OF BATAVIA, ILLINOIS, ASSIGNOR TO APPLETON MANUFACTURING COMPANY, A CORPORATION OF ILLINOIS.

CORN-HARVESTING MACHINE.

Application filed April 24, 1924. Serial No. 708,613.

This invention relates to a corn picking and husking machine.

One of the objects of the present invention is to provide a simplified and improved construction of a corn harvesting machine.

A further object of the invention is to provide a generally improved frame construction in the form of an arch above the traction wheels for supporting the operative elements of the corn harvesting machine.

A still further object of the invention is to provide an improved and novel form of husking mechanism which is adapted to cooperate with the snapping or picking rolls of the corn harvesting machine.

A still further object of the invention is to provide a simplified construction of the corn harvesting machine in which the operative elements are so arranged with respect to each other that the ears of corn being picked and husked are not caused to be conveyed or handled unnecessarily.

These and other objects are accomplished by providing a construction and arrangement of the various parts in the manner hereinafter described and particularly pointed out in the appended claims.

Referring to the drawings, Fig. 1 is a side elevational view of my improved corn picking machine.

Fig. 2 is a top plan view of the same.

Fig. 3 is a rear elevational view showing the position of my improved husking mechanism and its operative position with respect to the other parts of the machine.

Fig. 4 is a cross sectional view taken on the lines 4—4 in Fig. 3 showing the relative position of the husking rolls with respect to the conveyor for conveying the ears of corn over the husking rolls, and Fig. 5 is a detail view showing the manner in which my improved husking and conveying mechanism is operatively driven.

In carrying out my invention I have provided a novel frame construction which comprises a main frame 10, which is in the form of an arch or inverted substantially U-shaped construction. This arch member comprises a transversely extending channel member 11 which has secured on its outer ends substantially vertical depending brackets 12 and 13. These brackets 12 and 13 are provided at their lower ends, with apertures 14 and 15 which are adapted to have secured therein a main axle 16. Journalled on the axle 16 adjacent the brackets 12 and 13, respectively, are the two usual traction wheels 17, which, in turn, have secured thereto the usual driving sprockets 18. The arch frame member 10 is positoned sufficiently high above the traction wheels 17 to permit ample clearance between the top of the rotating wheels and the frame. Rotatably mounted in bearing brackets 19 and 20, which are secured to the channel member 11, is a supplemental drive shaft 21, which is operatively driven or geared to the main driving sprockets 18 by means of chains 22 and sprocket wheels 23. Extending longitudinally of the frame and secured in any well known manner to the main axle 16 are two supplemental frame members 24 and 25. The forward end of the supplemental frame members 24 and 25 are bent toward each other, as shown at 26 and come together as shown at 27 to a point where they extend parallel to each other, where they are secured to a bracket 28, which, in turn, is pivotally mounted on the truck wheels 29 of the usual tongue truck 30. The supplemental frame members 26 and main arch frame member 10 are secured together by cross thrust braces 31 and 32. The cross thrust braces 31 and 32 are secured together at their intersection by a spacing bolt 33. From this description it will readily be seen that I have provided a very simple and rigid frame construction and one in which the main frame member is arranged to support all the operative elements from a point above the traction wheels of the machine. Mounted forwardly and to one side of the arch frame member 10 are the usual upwardly inclined stalk guiding members 34. Positioned adjacent the inner edges of the stalk guiding members 34 and running parallel therewith are the usual endless stalk conveyors 35 and 36. Positioned to the rear of the conveyors 35 and 36 and lying in a plane parallel with the plane of the stalk guiding members 34 are the usual snapping rolls 37. The snapping rolls 37 are operatively driven by a bevelled pinion 38 meshing with a bevelled gear 39, which is secured to the grassward end of the supplemental shaft 21. The endless stalk conveyors 35 and 36 are operatively driven by shafts 40 and 41, respectively, which are provided with the usual miter gears 42 and 43. The shafts 40 and 41 are geared to one of the snapping rolls 37 by means of a chain 44 and sprocket wheels 45. The mechanism for conveying the stalks and for snapping the ears off the stalks of corn and the operative connections for driving these parts is well known in the art, and per se does not form any part of the present invention, for which reason a more detailed description is unnecessary.

Positioned adjacent the inner snapping roll 37 and running in a direction longitudinally of the machine is an endless conveyor 46 which is provided at regular intervals with paddles 47 for conveying the ears of corn which are snapped by the snapping rolls upwardly in an inclined trough 48, in which the endless conveyor 46 and paddles 47 travel. The endless conveyor 46 is operatively driven by a bevelled gear 49 which has a sprocket formed integrally therewith and engages the chain of the conveyor. The bevelled gear 49 meshes with a bevelled gear 50 which in turn is secured to a shaft 51. The shaft 51 is mounted in bearing members 53 and is operatively driven by a sprocket chain 54, which, in turn derives its power from a sprocket 55 secured to the supplemental drive shaft 21. The lower end of the endless conveyor 46 is geared to a sprocket 56 which is journalled in a bearing, not shown, at the lower end of the trough 48.

One of the novel features of my improved corn picking machine is the provision of an improved form of a husking mechanism and the position which it bears with respect to the other operative elements of the machine. This comprises a plurality of inclined husking rolls 57, which are arranged transversely at the rear of the machine with respect to the longitudinal direction of the machine and are rotatably mounted in the bearings 58 on either end of the rolls, which, in turn are supported in frame members 59 secured to the transverse frame member 60 which is supported on the supplemental frame members 24 and 25. The husking rolls are provided with the usual projections on the peripheral face thereof, not shown, for removing the husks from the ears of corn as they are conveyed over the upper surface of the rolls.

The husking rolls 57 are driven by a longitudinally extending shaft 61 which is rotatably mounted in a bearing bracket 62 formed integrally with the bearing 20 and in a bearing bracket 63, which is secured to the inclined frame member 64. The shaft 61 is operatively driven by bevelled gears 65, one of which is secured to the supplemental drive shaft 21 and the other of which is secured to the forward end of the longitudinal shaft 61. The rear end of the shaft 61 is provided with a sprocket and chain 66, which is geared to a sprocket 67 secured to a shaft 68. The shaft 68 is provided with pinions 69 which mesh with two corresponding pinions 70, which, in turn, are secured to the two inner husking rolls. The pinions 70 have formed integrally therewith spur gears 71 which mesh with adjacent spur gears 72 of two outside husking rolls.

From the above description it will readily be seen that the supplemental drive shaft 21 derives its power from the traction wheel 17 through the main drive sprockets 18 and drive chains 22 and transmits its power to the husking rolls through the meshing gears 65, through the shaft 61, chain and sprockets 66 and 67, through shaft 68 and bevelled gears 70 and 71 and spur gears 72, which are secured to the rotating husking rolls 57.

Another novel feature of my improved husking mechanism is the provision of an endless belt positioned over the husking rolls for depressing the ears in contact with the husking rolls and at the same time conveying the ears longitudinally of the husking rolls during the time the husks are being removed from the ears and also for delivering the husked ears to the delivery or elevator chute. This improved mechanism comprises an endless steel conveyor 73 which has its lower end mounted on idler sprockets 74 which are journalled on a shaft 75 secured to the support 59. The conveyor is operatively driven by a roller 76 mounted adjacent to and spaced from the upper ends of the husking rolls 57. The drive roller 76 is secured to a shaft 77 which is journalled in a bearing plate or support 78, which in turn is secured to the frame member 64. The roller 76 is driven by a sprocket 79 which is secured to a shaft in common with the roller and the sprocket is operatively driven by a chain 80 which is geared to a sprocket 81 which is secured to the shaft 68, see Fig. 5. This sprocket 81 engages the underlapping of the chain 80 and the chain 80 is held in contact with the sprocket by an idler sprocket 82, as clearly shown in Figs. 3 and 5. One end of the chain 80 is trained around a sprocket 83 which is secured to a shaft 84 mounted in bearings, not shown, secured to the frame member 85.

From the above description it will be seen that as the husking rolls 57 are rotated for removing the husks off the ears of corn that the endless conveyor belt 73 will press the ears in contact with the rolls and at the same time convey them down the inclined rolls to the delivery or elevator chute 88 of the machine. Positioned between the delivery end of the inclined conveyor 46 which conveys the corn from the snapping rolls 37 and the husking rolls 57 I have provided an inclined chute 87 which delivers the corn on to the husking rolls as clearly shown in Fig. 3.

From the above description it will be readily seen that I have provided an improved arch frame construction in which all the operative elements of the corn picking machine are supported by this improved frame construction in such a manner that a simple and efficient corn picking machine has been provided in which the corn that is being picked and husked is not handled unnecessarily but is directly conveyed after once it is snapped off the stalks by the snapping rolls to the husking rolls which lay transversely with respect to the longitudinal axis of the machine from whence it is delivered into the delivery chute 88 where it is conveyed to the wagon box.

It will also be noted that with my improved construction that by positioning the husking rolls at an inclined angle and positioning an endless belt conveyor over the husing rolls I have provided a novel and improved form of positively pressing the ears of corn as they are being husked against the husking rolls and also providing a means for positively conveying them longitudinally of the husking rolls during the time they are being husked.

While in the above specification I have described one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. The combination in a corn picking and husking machine, of husking rolls, and means positioned above said rolls for depressing unhusked ears of corn into close engagement with said rolls and conveying ears of corn longitudinally of said rolls.

2. The combination in a corn picking and husking machine, of husking rolls, and means positioned above said rolls for depressing unhusked ears of corn into close engagement with said rolls and conveying ears of corn longitudinally of said rolls comprising a plurality of transverse conveyor strips flexibly connected together.

3. The combination in a corn picking and husking machine, of husking rolls, and means positioned above said rolls for depressing unhusked ears of corn into close engagement with said rolls and conveying ears of corn longitudinally of said rolls comprising a plurality of steel conveyor strips arranged in parallel relation and flexibly connected together.

4. The combination in a corn picking and husking machine, of husking rolls arranged in a plurality of pairs in substantially parallel relation, means for depressing unhusked ears of corn against said husking rolls and for conveying them longitudinally of said rolls comprising a plurality of metallic members arranged in substantially parallel relation, and having flexible interconnecting means to form an endless belt of a width sufficient to extend over said husking rolls, and means for supporting and rotating said endless conveyor belt with the lower lap of the belt suspended above said husking rolls.

5. The combination in a corn picking and husking machine, of husking rolls arranged in a plurality of pairs in substantially parallel relation, means for depressing unhusked ears of corn against said husking rolls and for conveying them longitudinally of said rolls, comprising a plurality of metallic members arranged in substantially parallel relation, and having flexible interconnecting means to form an endless belt of a width sufficient to extend over each of said husking rolls, and means for supporting and rotating said endless belt with the lower lap thereof suspended above the top of said rolls, power being applied to said means so that the loose run of said flexible belt will be that adjacent the top side of said husking rolls.

6. The combination in a corn picking and husking machine, of husking rolls arranged in a plurality of co-operating pairs, and means for resiliently pressing unhusked ears of corn toward said rolls and for conveying such ears longitudinally of said rolls comprising a plurality of transverse members flexibly connected together and resiliently pressing upon ears fed to said rolls and being adapted at the same time to move said ears longitudinally of said rolls.

7. The combination in a corn picking and husking machine, of husking rolls arranged in a plurality of co-operative pairs in substantially parallel relation, a plurality of feeding and pressure strips flexibly connected and yieldingly suspended over the top side of said rolls and in close proximity thereto, and means for moving said strips longitudinally of said rolls.

8. The combination in a corn picking and husking machine, of a pair of co-operating husking rolls, and means for moving unhusked ears of corn longitudinally of said rolls from one end thereof to the other end, said means being adapted also to continuously press such unhusked ears of corn against the effective husking portions of said rolls.

9. The combination in a corn picking and husking machine, of husking rolls arranged in a plurality of pairs in substantially parallel relation, and means for conveying unhusked ears of corn from one end thereof to the other, comprising an endless belt formed of metallic members flexibly connected together in substantially parallel relation with the loose run thereof suspended immediately above said husking rolls, said members being arranged transversely of said rolls and of a length to extend substantially from one side of said rolls to the opposite side thereof, whereby to feed said unhusked ears longitudinally of said husking rolls and to continuously press each of said ears toward the effective husking portions of said rolls.

10. The combination in a corn picking and husking machine, of husking rolls, means positioned above said rolls for pressing unhusked ears of corn into close engagement with said rolls and conveying ears of corn longitudinally of said rolls, said means comprising a plurality of metallic members arranged in substantially parallel relation and having flexible interconnecting means to form an endless belt, and means for supporting said belt comprising a pair of substantially parallel shafts transversely disposed with respect to said rolls and positioned respectively adjacent the opposite ends thereof, in a manner to cause the slack or loose run of the belt to yieldingly press the ears of corn against said rolls during the travel of the ears along substantially the entire length of said rolls.

11. The combination in a corn picking and husking machine, of a plurality of pairs of husking rolls arranged in substantially parallel relation, means for depressing unhusked ears of corn against said rolls and for conveying ears of corn longitudinally thereof, said means comprising a plurality of substantially parallel members flexibly connected to form an endless belt of a width sufficient to extend over each of said husking rolls, and a pair of shafts for supporting said belt, each of said shafts being positioned adjacent the extreme ends of said rolls in a manner to provide a slack or loose side of said belt adjacent the upper faces of said rolls, to engage and press the unhusked ears of corn against the rolls throughout substantially the length of said rolls while conveying the ears of corn longitudinally thereof.

In testimony whereof I have signed my name to this specification on this 19th day of April, A. D. 1924.

JOHN VAN NORTWICK.